United States Patent [19]
Paramonoff

[11] 3,797,293
[45] Mar. 19, 1974

[54] SAFETY LOCK FOR SAFETY EQUIPMENT SUCH AS HOODS FOR CAN MAKING MACHINERY

[75] Inventor: Elpidifor Paramonoff, Los Angeles, Calif.

[73] Assignee: Stanclun, Inc., St. Compton, Calif.

[22] Filed: Jan. 22, 1973

[21] Appl. No.: 325,908

[52] U.S. Cl............... 72/26, 113/7 R, 100/53
[51] Int. Cl............................................ B21d 55/00
[58] Field of Search........... 72/21, 26; 113/1 R, 7 R; 100/53; 192/133, 134; 74/612, 613, 615

[56] References Cited
UNITED STATES PATENTS

| | | | |
|---|---|---|---|
| 3,554,067 | 1/1971 | Scutella | 100/53 |
| 2,683,515 | 7/1954 | Horn et al. | 192/134 |
| 2,563,296 | 8/1951 | White et al. | 192/134 |

*Primary Examiner*—Charles W. Lanham
*Assistant Examiner*—M. J. Keenan
*Attorney, Agent, or Firm*—Mahoney, Schick & Cislo

[57] ABSTRACT

A first fluid line requiring fluid pressure therein throughout operation of an operating mechanism communicates with a fluid cylinder which when fluid pressurized, extends a plunger into secure engagement with an engagement member in its fully engaged position. The engagement member forms a part of safety equipment which places the engagement member in fully engaged position when closed and must be retained closed during operating mechanism operation for safety purposes. A second fluid line requiring fluid pressure therein to be maintained for the starting of the operating mechanism or for the continued operation thereof communicates with a fluid vent relieving fluid pressure when open and retaining fluid pressure when closed by a ball controlled by a pivotal cantilever member. An end portion of the cantilever member is engaged by the engagement member when in fully engaged position retaining the ball against fluid venting, the cantilever member relieving the ball for fluid venting when the engagement member is in any disengaged position away from fully engaged position. Thus, the cantilever member and ball absolutely assures that the engagement member will be in fully engaged position prior to start or for continued operation of the operating mechanism and the cylinder and plunger positively locks the engagement member in fully engaged position during operating mechanism operation.

12 Claims, 4 Drawing Figures

PATENTED MAR 19 1974 3,797,293

SAFETY LOCK FOR SAFETY EQUIPMENT SUCH AS HOODS FOR CAN MAKING MACHINERY

BACKGROUND OF THE INVENTION

This invention relates to a safety lock for safety equipment such as hoods for can making machinery, and more particularly, to such a lock which is fluid actuated and is particularly useful for connection into a machine or other operating structure for sensing the operation of the operating structure and preventing the opening or removal of certain safety equipment throughout such operation, while at the same time, preventing the commencement or continued operation of such operating equipment in the event such safety equipment is opened or removed. In this manner, there is always the positive assurance that the safety equipment will be retained in its required closed position once it is fully closed and operation of the operating structure is commenced, as well as it being positively assured that operation of the operating structure can not be commenced until the safety equipment is fully closed. The additional safety feature of positively assuring immediate cessation of operation of the operating structure at any time the safety equipment is opened during operation adds a final fail safe feature in the event that portion retaining safety equipment closure during operation should malfunction. As still an added feature, the lock, being fluid actuated, may preferably make use of existing fluid systems within the operating structure so that no additional fluid systems are required.

Many situations are presented in the use of operating structures, and particularly those which involve presently existing fluid systems, where operation of the operating structures without safety equipment in place can present an extreme danger of human injury. At the same time, with the same operating structures, if the proper safety equipment is provided and the same is maintained in the proper intended position, the danger of human injury is virtually eliminated. Thus, it is extremely desirable from the safety standpoint to provide some means of insuring that prior to commencement of operation of hazardous operating structures, the safety equipment therefore will be in place and closed, and will remain in place and closed throughout such operating structure operation. It is additionally desirable that a fail safe situation be provided for such safety equipment, that is, a further means of assuring that if the safety equipment is somehow displaced or opened during operating structure operation, perhaps through malfunctioning of the locking mechanisms, the operation of the operating structures will immediately cease.

As an example, in metallic can body making equipment, such as metallic can body trimmers, there are numerous component parts which, if they remain exposed during trimmer operation, can constitute a present danger of injury to operating workmen and other personnel. With a metallic can body trimmer, there are moving metal cutting knives, rotating gearing and cams, and driving motors, all of which must be accessible for adjustment and maintenance operations, yet during the operation of the trimmer can present safety hazards. The obvious solution in eliminating such safety hazards is the provision of covering hoods which, although they must be capable of being opened or removed for the adjustment and maintenance operations, will guard against access during operation thereof.

Such safety equipment, however, is only of value as long as it is in place guarding access to the hazardous components during operation of the equipment and there is a tendency of workmen, at times, not to close the safety equipment or to maintain the same closed during machine operation. Thus, to completely assure that the safety equipment will be in place and closed during all operations of the operating equipment, it is essential that some means be provided for preventing operation when the safety equipment is displaced and open and only permitting operation when the safety equipment is in place and closed. Furthermore, in order to present a fail safe situation, it is an additional requirement that at any time that the safety equipment is displaced and opened during operation of the machine, such operation will immediately automatically cease, thereby protecting against any possible malfunctions.

OBJECTS AND SUMMARY OF THE INVENTION

It is, therefore, an object of this invention to provide a safety lock for safety equipment such as hoods for can making machinery wherein the safety lock structure adds fail safe features to the safety equipment positively preventing operation of an operating structure being protected by the safety equipment unless the safety equipment is in intended and safety guarding closed position, whether at commencement of operation or displacement of the safety equipment during operation, and also positively locks the safety equipment in safety guarding position immediately upon the operation of the operating structure being commenced. In the preferred form, the initiation of operation of the operating structure is absolutely prevented until the safety equipment is closed in safety guarding position and when the safety equipment is so closed, this relationship is automatically sensed and permits the commencement of operation of the operating structure. In turn, as soon as the operating structure begins operation, such operation is further sensed and the safety equipment secured in this closed safety guarding position throughout such operation. The fail safe feature of the lock is provided such that if the securement of the safety equipment in its closed safety guarding position does not take place on the commencement of operation of the operating structure or anytime that the safety equipment is displaced from its closed safety guarding position, operation of the operating structure will immediately cease and cannot be restarted until the safety equipment is once again in place.

It is a further object of this invention to provide a safety lock for safety equipment incorporating the foregoing features which is constructed for solely fluid pressure actuation for sensing and may make use of operating structure present fluid pressure systems with usually the only slight additions thereto being a communication with such present fluid pressure system. The requirements for the preferred form of the safety lock of the present invention for sole fluid operation thereof are a fluid pressure line requiring fluid under pressure therein prior to and during any operation of the operating structure being possible and a fluid pressure line which must automatically receive fluid pressure therein immediately at the commencement and continued operation of the operating structure. In the first case, the fluid pressure line which will have fluid under pressure therein prior to it being possible to start and continue operation of the operating structure might be any fluid pressure line of the usual operating structure fluid pressure system, such as a fluid pressure actuated valve or switch which is required to signify activation of the usual fluid pressure system of the operating structure before actual operation thereof may be started or continued. In the second case, the fluid pressure line may be some fluid pressure line in the usual fluid pressure system which must receive fluid under pressure therein in order to effect the start of operation of the operating structure, such as the fluid pressure line to a usual fluid pressure actuated clutch. The safety switch merely makes use of these presently existing fluid pressure lines in conjunction with the various operating structure components already requiring such fluid pressure lines so that no true additions to the fluid pressure system are required.

It is still a further object of this invention to provide a safety lock for safety equipment of the foregoing general type and having the foregoing advantageous features, yet which is of maximum simplified form despite its positive fail safe operation. According to the preferred form of the present invention, venting of the fluid pressure line requiring fluid under pressure to be maintained therein prior to any commencement of operation or continued operation of the operating structure may be accomplished through a simple pressurized fluid venting port retained closed and maintaining fluid pressure within the fluid pressure line by a cantilever member engaged by the safety equipment in the closed position retaining a ball in the venting port closing position. When the safety equipment is opened or displaced, the pressure thereof against the cantilever member and, in turn, against the port closing ball is relieved so that the pressurized fluid can vent and it is impossible to maintain a pressure of the fluid within the fluid pressure line. Also according to a preferred embodiment, the locking of the safety equipment in the closed position may be accomplished through a position controlled plunger of a present actuated cylinder which is projected to extended position engaged with and securing the safety equipment in closed position when the fluid pressure is received from, for instance, the fluid actuated clutch of the operating structure.

Other objects and advantages of the invention will be apparent from the following specification and the accompanying drawing which are for the purpose of illustration only.

DESCRIPTION OF THE BEST EMBODIMENT CONTEMPLATED

Figure 1:
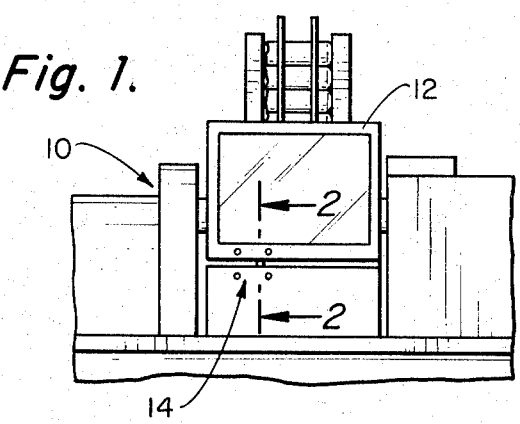
FIG. 1 is a fragmentary, front elevational view of an operating structure, in this case, a metallic can body trimmer, having typical safety equipment installed thereon and incorporating a preferred embodiment of the safety lock of the present invention.

Referring to the drawing, a preferred embodiment the safety lock of the present invention is illustrated therein installed in can making machinery, specifically, a metallic can body trimmer generally indicated at 10 in FIG. 1 having a typical form of safety equipment, a hood 12, covering various possible injury causing movable parts such as metal cutting knives, gears, cams, clutches and driving motors. As shown in FIG. 1, the hood 12 is in closed, safety guarding and moving component covering position with a safety lock generally indicated 14 and incorporating the principles of the present invention mounted partially on the hood 12 and partially on a frame portion of the trimmer 10 as will be explained more in detail below. The hood 12 is displaceable or pivotal in usual manner upwardly and rearwardly as viewed in FIG. 1 separating at the safety lock 14 so as to provide access to the moving components of the trimmer 10 for conducting adjustment and maintenance operations, but it is obvious that it is vital that the hood 12 remain closed as shown in FIG. 1 during operation of the trimmer 10 so as to carry out its safety guarding functions.

At the onset, it is pointed out that the particular environment illustrated herein for use of the safety lock 14 of the present invention is only an illustrative environment wherein the safety lock is particularly useful. It will be clear from the following description, however, that the safety lock 14 of the present invention may be useful in many other environments, whether can making machinery or otherwise, and the only requirement is that the proper fluid pressure supplied be available for proper operation of the same. Thus, it should be kept in mind that it is not intended to limit the principles of the present invention to the particular installation or form shown and the principles of the present invention should be broadly construed within the limits of the following claims.

Figure 2:
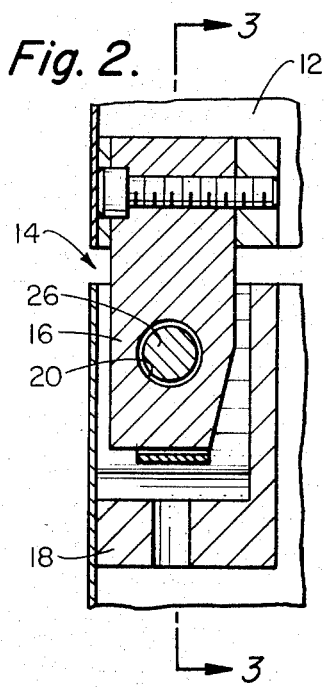
FIG. 2 is an enlarged, fragmentary, vertical sectional view looking in the direction of the arrows 2—2 in FIG. 1 and showing the safety equipment closed and the safety lock of the present invention in locked position.
Figure 3:
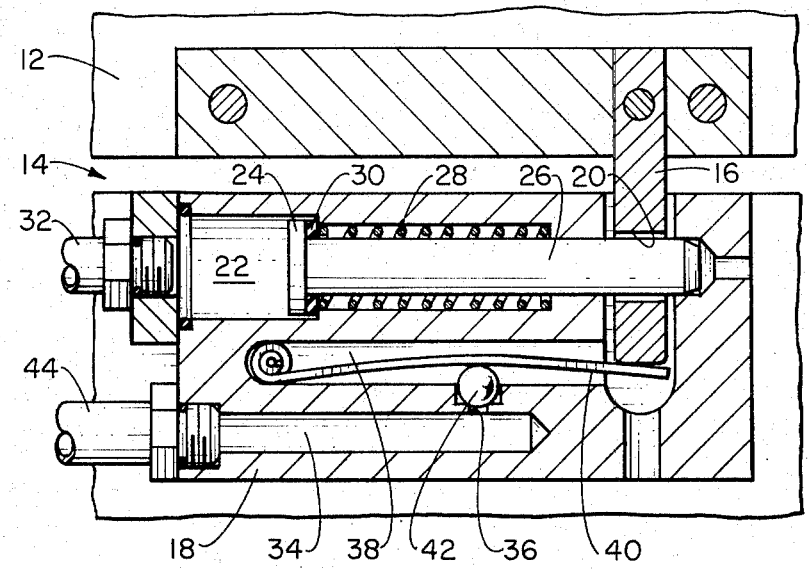
FIG. 3 is a fragmentary, vertical sectional view looking in the direction of the arrows 3—3 in FIG. 2.
Figure 4:
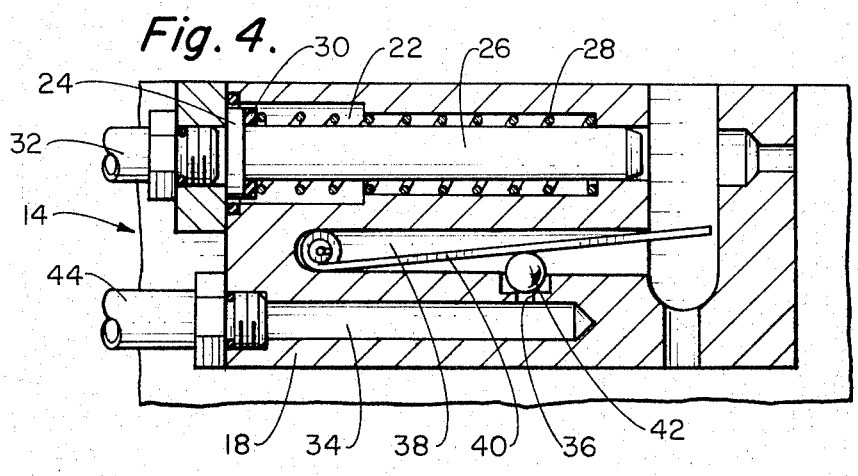
FIG. 4 is a view similar to FIG. 3, but showing the safety equipment in open or displaced position and the safety lock of the present invention in non-locking position.

As shown more particularly in FIGS. 2 and 3 with the safety lock 14 engaged or closed and locked retaining the hood 12 in the closed position of FIG. 1, and in FIG. 4 with the safety lock disengaged or open and the hood pivoted upwardly to open position, an engagement member or tongue 16 is secured to the hood 12 and projects generally downwardly from a forward edge of the hood at the safety lock 14. When the hood 12 is in closed position as shown in FIGS. 2 and 3, the tongue 16 is received downwardly within a lock frame 18 secured to a stationary frame portion of the trimmer 10. When in a fully closed position of the safety lock 14, the tongue 16 is in a fully engaged position shown in FIGS. 2 and 3 with an engagement opening 20 therethrough positioned within the lock frame 18, the tongue 16 when disengaged being removable from the lock frame 18 to various disengaged positions depending on the pivotal movement of the hood 12.

Mounted within the lock frame 18, the safety lock 14 includes first fluid pressure means in the form of a fluid cylinder 22 having a reciprocally moving piston 24 therein which, in turn, has a latching member or plunger 26 secured thereto and reciprocally movable therewith. A coil spring 28 telescopes the latching plunger 26 and normally urges the plunger to a non-latching position as shown in FIG. 4 free of the tongue 16 and permitting free movement of the tongue from and into its fully engaged position (FIG. 3) within the lock frame 18. When, however, fluid under a predetermined pressure sufficient to overcome the spring 28 is admitted to the cylinder 22, the piston 24 and plunger 26 are moved from the disengaged or retracted position shown in FIG. 4 to the right into the engaged or extended position shown in FIG. 3, the plunger being received through the tongue engagement opening 20 and retaining the tongue 16 in its fully engaged position when the tongue at that time has been moved to such fully engaged position.

A fluid sealing ring 30 surrounds the plunger 26 at its point of securement to the piston 24 and it will be noted that the sealing ring provides little, if any, sealing value when the piston 24 and plunger 26 are in the retracted or non-latching position as shown in FIG. 4. As shown in FIG. 3, however, when the piston 24 and plunger 26 are in extended latching position, the sealing ring is forced by the piston against the lock frame 18 so as to seal off the cylinder 22 around the plunger. This is merely a simplified form of seal for the cylinder 22, but is adequate for the purposes since when the piston 24 and plunger 26 are in retracted and non-latching position, there is no fluid under pressure within the cylinder 22, but when the piston and plunger are in extended latching position it is required that fluid under pressure be maintained in the cylinder in order to retain the piston and plunger in such latching position against rhe counterforce of the coil spring 28. This arrangement of the sealing ring 30, therefore, presents a unique sealing arrangement of simplified form and minimum expense, as well as reducing maintenance problems while still presenting a functionally proper seal. Furthermore, this positioning of the sealing ring 30 reduces the friction of movement of the piston 24 and plunger 26 improving response thereof to low fluid pressure levels.

For important purposes of the present invention, the cylinder 22 is connected in communication with a first fluid line 32 which is associated in the fluid distribution system of the particular operating mechanism, in this case, the trimmer 10 so that this first fluid line positively requires fluid under at least the predetermined pressure required for moving the piston 24 and plunger 26 against the counterforce of the spring 28 when the operating mechanism or trimmer is operated and throughout such operation. Thus, immediately upon the operating mechanism or trimmer 10 commencing operation, and throughout such operation, the first fluid line 32 will have fluid under the predetermined pressure therein and until such operation is ceased when the pressure in the first fluid line will be relieved. As applied specifically to the trimmer 10, the first fluid line 32 can be connected into communication with a fluid line supplying a fluid actuated, main driving clutch (not shown) of the trimmer, so that at commencement of and throughout operation of the trimmer 10, the drive clutch and the first fluid line 32 must be supplied with the fluid under pressure in order to commence and sustain such operation by maintaining the clutch engaged, and when operation of the trimmer is ceased by disengagement of the drive clutch through the relief of fluid pressure thereto, this will relieve the fluid pressure in the first fluid line. This fluid under pressure is preferably air, but obviously other pressurized gases or liquids could be used.

A second fluid pressure means is also formed in the lock frame 18 and includes a pressure chamber 34 vented through a port 36 freely through a control chamber 38 and ultimately from the lock frame 18 as shown. A cantilevered control member 40 is pivotally mounted at one end in the control chamber 38 projecting in cantilever fashion over closing means for the port 36 in the form of a ball 42 overlying the control chamber end of the port. A free end of the control member 40 extends, again in cantilever fashion, from the control member intermediate engagement with the ball 42 to the right into interference with the downward path of the tongue 16 when the tongue is moved into its fully engaged position.

In other words, when the tongue 16 is in its fully engaged position as shown in FIG. 3, the tongue bears downwardly against the free end of the control member 40 forcing the control member against the ball 42 and exerting downward pressure to cause the ball to seal off the port 36 placing the pressure chamber 34 in non-venting condition. When, however, the tongue 16 moves out of its fully engaged position into any of its various disengaged positions, its downward pressure against the free end of the control member 40 is relieved and downward pressure of the control member against the ball 42 is relieved so that fluid under pressure at least having a predetermined pressure will vent upwardly through the port 36 and freely through and from the control chamber 38. The control member 40 may be formed of relatively rigid, yet somewhat flexible material such as spring metal, preferably spring steel, so that when downward pressure is exerted on the free end thereof by the tongue 16, this control member can flexibly bow over the ball 42 in the manner shown in FIG. 3 and retain proper downward pressure on the ball for sealing the port 36. The ball 42 can be formed of any rigid material and is preferably formed of a rigid plastic.

A second fluid line 44 communicates with the control chamber 38 and under the principles of the present invention is required to have fluid under a predetermined pressure therein prior to commencement of operation of the operating mechanism, in this case the trimmer 10, and to maintain such fluid therein under the predetermined pressure throughout any operation of the operating mechanism or trimmer. Again, there are many components connected into the usual fluid distribution system of operating mechanisms such as the trimmer which require these same fluid conditions prior to commencement of operation and throughout operation of the operating mechanism or trimmer so that the second fluid line 44 could be connected in communication with the same fluid lines supplying that or these components. For instance, the trimmer 10 may include a fluid pressure actuated switch or valve which requires fluid under pressure within the fluid pressure system and actuating the switch or valve in order that the trimmer can be initially operated and throughout maintenance of the same in such operation whereby, if pressurized fluid is vented from the control chamber 38, fluid pressure will be relieved from the switch or valve and the trimmer will not either commence operation or continue operation, whereas with the control chamber 38 closed from venting, the pressure of the pressurized fluid will be maintained and the switch or valve will sustain initial and continued operation of the trimmer. As in the case of the fluid cylinder 22, the fluid under pressure from the second fluid line 44 is preferably air, but may be any other gaseous fluid or liquid.

In operation of the safety lock of the present invention, with the hood 12 pivoted upwardly removing the tongue 16 from its fully engaged position, the control member 40 will be disengaged and assume the position as shown in FIG. 4 permitting venting of fluid under pressure freely through the control chamber 38 upwardly freely through the port 36 past the ball 42. Thus, if during the open position of the hood 12, it is attempted to pressurize the fluid pressure system of the trimmer 10 required for commencing operation thereof, fluid under pressure will vent from the control chamber and not permit pressure to be maintained within the second fluid line 44 so as to completely prevent operation of the trimmer. The plunger 26 will remain in retracted non-latching position since there will be no fluid under pressure maintained in the first fluid line for lack of fluid under pressure being maintained in the fluid system of the trimmer 10.

When the hood 12 is closed moving the tongue 16 downwardly into its fully engaged position shown in FIG. 3, the tongue will engage the control member 40 causing the ball 42 to close off venting of the control chamber 38 through the port 36 and pressurization of the fluid system of the trimmer 10 will be possible since such pressure cannot be relieved through the control chamber. Operation of the trimmer 10 can, therefore, be commenced which will transmit fluid under pressure through the first fluid line 32 into the cylinder 22 forcing the plunger 26 into extended latching position through and positively retaining the tongue 16 in its fully engaged position so as to prevent opening of the hood 12 during operation of the trimmer 10. Cessation of operation of the trimmer 10 relieves the fluid under pressure from the first fluid line 32 permitting the plunger 26 to be withdrawn into non-latching position by the spring 28 and permitting the hood 12 to be opened.

Assuming a malfunctioning of the cylinder 22 during which the plunger 26 is not moved from its retracted non-latching position during operation of the trimmer 10 so that the tongue 16 is not positively latched in its fully engaged position, if the hood is moved toward an open position carrying the tongue from its fully engaged position into any disengaged position, the pressure of the tongue downwardly against the control member 40 will be relieved permitting the control chamber 38 to vent and prevent the trimmer 10 from being operated or cause it to immediately cease operation if operating. This unique arrangement of the safety lock 14 of the present invention, therefore, provides an important fail safe feature always operable despite malfunctioning of the latching plunger 26 and its motivating cylinder 22. The safety lock 14 of the present invention, therefore not only prevents operation of the trimmer 10 when the hood 12 is open and requires the hood to be closed prior to trimmer operation being commenced, but also provides the unique fail safe feature that if the hood is somehow opened at any time during trimmer operation, such operation will immediately cease.

Still another important advantage of the safety lock 14 of the present invention provided by inclusion of the positive locking or latching of the safety equipment, in this case, the hood 12, throughout any operation of the trimmer or other machinery by the first pressure means or cylinder 22 with its latching plunger 26 is that the safety equipment cannot be opened at random even though it will immediately stop trimmer operation through the second pressure means including the chamber 34 and port 36. Certain types of machinery require stopping thereof at a particular safe period during an operating cycle in order to prevent endangering valuable tooling and prevent improperly formed manufactured parts. Such machinery has normal stopping means which may be actuated at any time during a cycle, but will only stop the machinery during the cycle safe period. Thus, the safety lock 14 of the present invention normally requires use of the normal stopping means and eliminates possibility of such endangerment by maintaining positive locking of the safety equipment during any machinery operation and preventing random machinery stopping opening thereof.

I claim:

1. In a safety lock for use with operating mechanisms; the combination of: an engagement member movable between a fully engaged position and various disengaged positions; first fluid pressure means normally retained in a non-latching position and movable by fluid under at least a predetermined pressure to a latching position, said first fluid pressure means remaining in said non-latching position when lacking said fluid under said predetermined pressure, said first fluid pressure means in latching position securing said engagement member in fully engaged position when moved to said latching position while said engagement member is in said fully engaged position, said first fluid pressure means in non-latching position permitting movement of said engagement member between said fully engaged and various disengaged positions; first fluid line means positively requiring fluid under at least said first fluid pressure means predetermined pressure therein throughout operation of an operating mechanism, said first fluid line means being connected in communication with said first fluid pressure means; second fluid pressure means movable between a closed positioned retaining fluid under at least a predetermined pressure therein and venting positions venting fluid therefrom and reducing fluid pressure therein to at least below said predetermined pressure, said second fluid pressure means being operably associated with said engagement member moved to said closed position when said engagement member is in said fully engaged position and moving into said venting positions when said engagement member moves into said disengaged position; second fluid line means positively requiring fluid under pressure to be maintained therein at a pressure not lower then said second fluid pressure means predetermined pressure during commencement of and throughout operation of said operating mechanism, said second fluid line means being connected in communication with said second fluid pressure means.

2. A safety lock as defined in claim 1 in which said first fluid pressure means includes a latching member movable between said first fluid pressure means non-latching and latching positions, said latching member engageably securing said engagement member in said fully engaged position when moved to said latching position while said engagement member is in said fully engaged position.

3. A safety lock as defined in claim 1 in which said first fluid pressure means includes a cylinder, a piston in said cylinder and having a latching plunger operably connected thereto and movable therewith, resilient means operably connected to said piston and latching plunger normally resiliently retaining said latching plunger in said first fluid pressure means non-latching position, said latching plunger engageably securing said engagement member in said fully engaged position when moved to said first fluid pressure means latching position while said engagement member is in said fully engaged position.

4. A safety lock as defined in claim 1 in which said first fluid pressure means includes a cylinder, a piston in said cylinder and having a latching plunger operably connected thereto and movable therewith, resilient means operably connected to said piston and latching plunger normally resiliently retaining said latching plunger in said first fluid pressure means non-latching position, said latching plunger engageably securing said engagement member in said fully engaged position when moved to said first fluid pressure means latching position while said engagement member is in said fully engaged position; and in which sealing means is operably associated with said piston of said first fluid pressure means operable for sealing fluid within said cylinder of said first fluid pressure means when said latching plunger is in said latching position and being free of complete sealing of fluid within said cylinder and permitting slight venting of said fluid from said cylinder when said latching plunger is in said non-latching position.

5. A safety lock as defined in claim 1 in which said second fluid pressure means includes control means engaged by said engagement member when said engagement member is in said fully engaged position moving said second fluid pressure means to said closed position, said control means moving to permit said fluid venting from said second fluid pressure means when said engagement member is moved from said fully engaged position.

6. A safety lock as defined in claim 1 in which said second fluid pressure means includes a port through which fluid may be vented from said second fluid pressure means, a ball over said port movable between said second fluid pressure means closed and venting positions, control means operably associated with said ball movable between a second fluid pressure means closed position with said ball in said closed position and a second fluid pressure means venting position with said ball in said venting position, said control means being engaged by said engagement member and moved to said closed position when said engagement member is moved into said fully engaged position, said control means moving to said venting position upon movement of said engagement member into said disengaged positions.

7. A safety lock as defined in claim 1 in which said second fluid pressure means includes control means moving said second fluid pressure means into said closed position when said control means is engaged by said engagement member in movement of said engagement member into said fully engaged position, said control means moving to move said second fluid pressure means into said venting position through pressure of said fluid within said second fluid pressure means when said control means is permitted said movement by lack of said engagement member being in said fully engaged position.

8. A safety lock as defined in claim 1 in which said second fluid pressure means includes a port venting fluid from said second fluid pressure means when open and being free of said venting when closed, a ball overlying said port movable between port closing and opening positions, pivot means overlying said ball and moving said ball to port closing position when said pivot means is engaged by said engagement member upon movement of said engagement member into said fully engaged position, said pivot means pivoting to release said ball and said ball being moved into port opening position by fluid within said second fluid pressure means upon said engagement member moving into said disengaged positions.

9. A safety lock as defined in claim 1 in which said second fluid pressure means includes a port opening from said second fluid pressure means and having port closing means thereover movable between a closed position closing off said port and a venting position permitting venting of fluid from said port, a cantilever member overlying said port closing means at an intermediate portion thereof and having an end portion engageable by said engagement member during movement of said engagement member into said fully engaged position, said engagement member in said fully engaged position forcing said cantilever member against said port closing means and moving said port closing means into said port closing position, said engagement member in said disengaged positions releasing and cantilever member to release said port closing means permitting said port closing means to move into said port venting positions.

10. A safety lock as defined in claim 1 in which said second fluid pressure means includes a port opening from said second fluid pressure means and having a ball thereover movable between a closed position closing off said port and a venting position permitting venting of fluid from said port, a cantilever member overlying said ball at an intermediate portion thereof and having an end portion engageable by said engagement member during movement of said engagement member into said fully engaged position, said engagement member in said fully engaged position forcing said cantilever member against said ball and moving said ball into said closed position, said engagement member in said disengaged positions releasing said cantilever member to release said ball permitting said ball to move into said port venting positions.

11. A safety lock as defined in claim 1 in which said first fluid pressure means includes a latching member movable between said first fluid pressure means non-latching and latching positions, said latching member engageably securing said engagement member in said fully engaged position when moved to said latching position while said engagement member is in said fully engaged position; and in which said second fluid pressure means includes a port through which fluid may be vented from said second fluid pressure means, a ball over said port movable between said second fluid pressure means closed and venting positions, pivot means operably associated with said ball pivotal between a second fluid pressure means closed position with said ball in said closed position and a second fluid pressure means venting position with said ball in said venting position, said pivot means being engaged by said engagement member and moved to said closed position when said engagement member is moved into said fully engaged position, said pivot means pivoting to said venting position upon movement of said engagement member into said disengaged positions.

12. A safety lock as defined in claim 1 in which said first fluid pressure means includes a cylinder, a piston in said cylinder and having a latching plunger operably connected thereto and movable therewith, resilient means operably connected to said piston and latching plunger normally resiliently retaining said latching plunger in said first fluid pressure means non-latching position, said latching plunger engageably securing said engagement member in said fully engaged position when moved to said first fluid pressure means latching position while said engagement member is in said fully engaged position; and in which said second fluid pressure means includes a port opening from said second fluid pressure means and having a ball thereover movable between a closed position closing off said port and a venting position permitting venting of fluid from said port, a cantilever member overlying said ball at an intermediate portion thereof and having an end portion engageable by said engagement member during movement of said engagement member into said fully engaged position, said engagement member in said fully engaged position forcing said cantilever member against said ball and moving said ball into said closed position, said engagement member in said disengaged positions releasing said cantilever member to release said ball permitting said ball to move into said port venting position.

* * * * *

UNITED STATES PATENT OFFICE
CERTIFICATE OF CORRECTION

Patent No. 3797293            Dated March 19, 1974

Inventor(s) ELPIDIFOR PARAMONOFF

It is certified that error appears in the above-identified patent and that said Letters Patent are hereby corrected as shown below:

--Assignee: Standun, Inc., Compton, Calif.--

Signed and sealed this 9th day of July 1974.

(SEAL)
Attest:

McCOY M. GIBSON, JR.
Attesting Officer

C. MARSHALL DANN
Commissioner of Patents